Feb. 15, 1944.    G. GRINDROD    2,341,769
METHOD OF REGENERATING CURING BRINE
Filed June 23, 1941    2 Sheets-Sheet 1
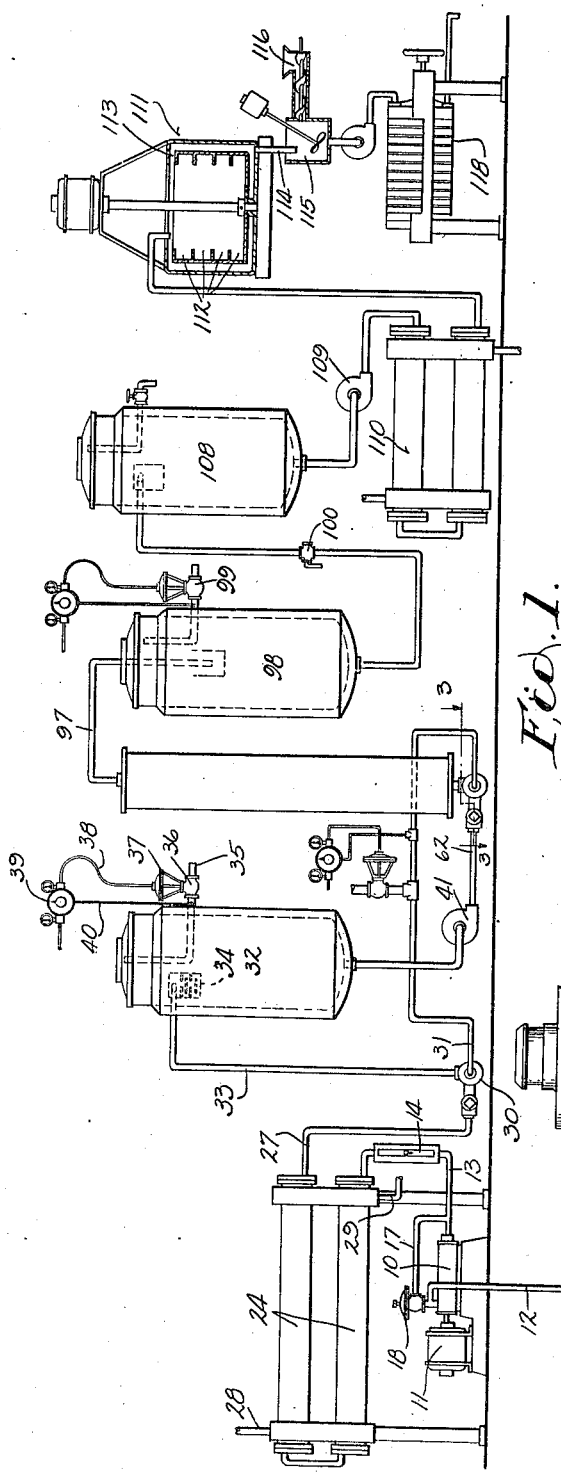
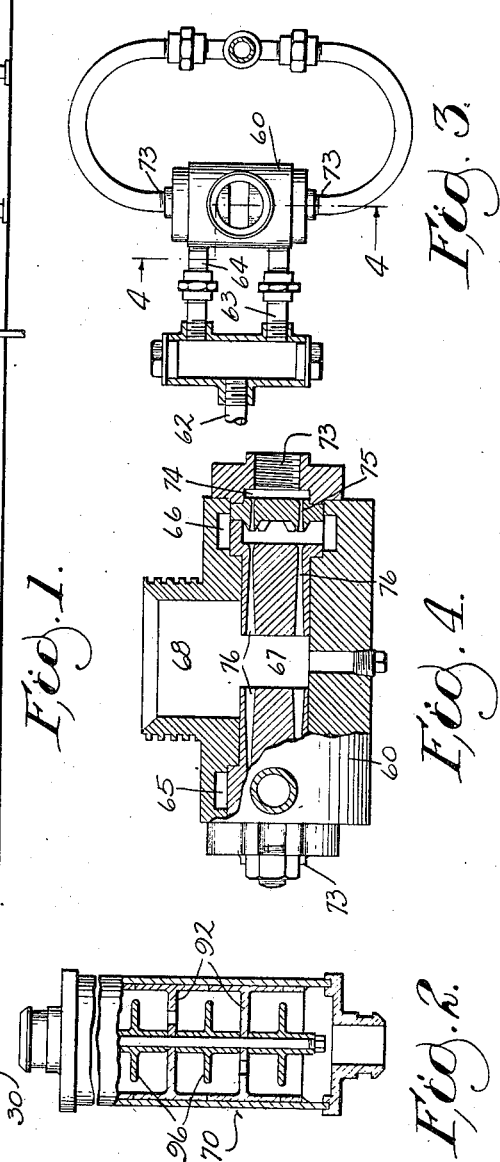
INVENTOR
GEORGE GRINDROD,
BY
Wheeler, Wheeler + Wheeler
ATTORNEYS.

Feb. 15, 1944.  G. GRINDROD  2,341,769
METHOD OF REGENERATING CURING BRINE
Filed June 23, 1941   2 Sheets-Sheet 2
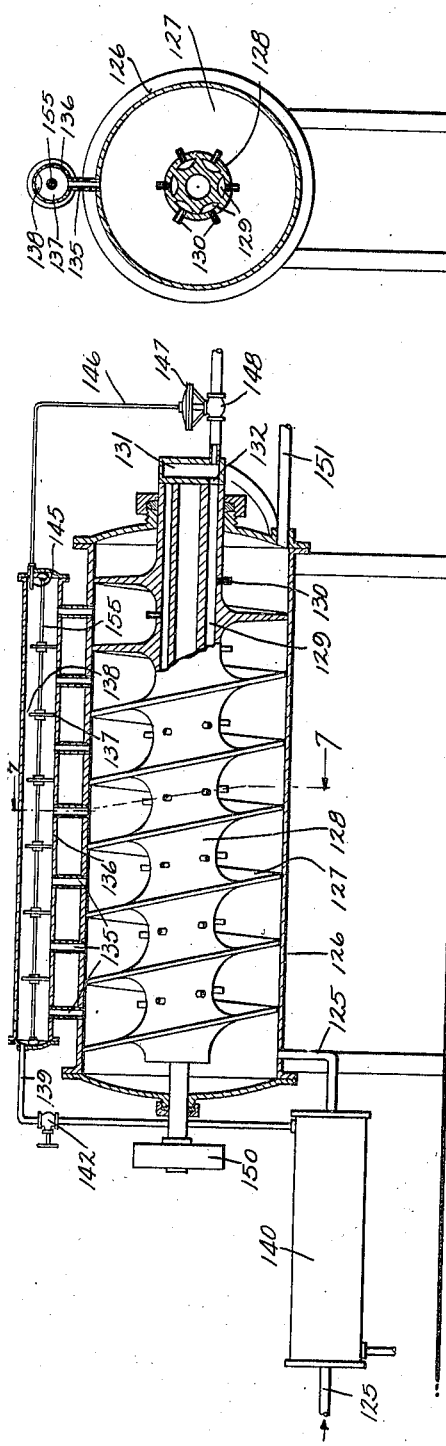
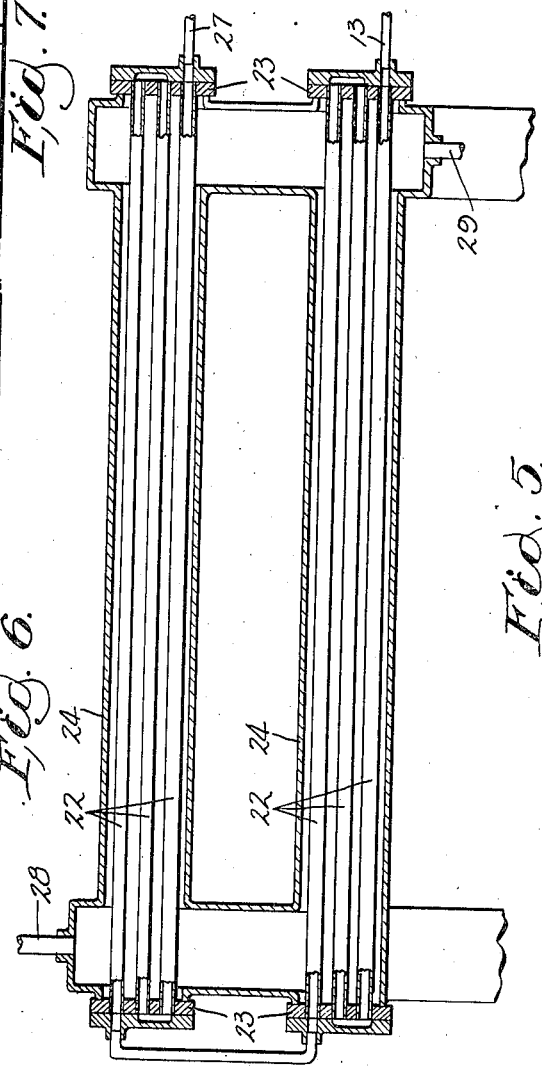
INVENTOR
GEORGE GRINDROD
BY
Wheeler, Wheeler & Wheeler
ATTORNEYS Patented Feb. 15, 1944

2,341,769

UNITED STATES PATENT OFFICE 2,341,769

METHOD OF REGENERATING CURING BRINE

George Grindrod, Oconomowoc, Wis., assignor to Grindrod Process Corporation, Dover, Del., a corporation of Delaware Application June 23, 1941, Serial No. 399,387

3 Claims. (Cl. 99—159)

My invention relates to improvements in regenerated curing brine and method of regeneration.

My object is to make possible the repeated use of curing brines and, within certain limits, a progressive improvement in the quality of the brine with successive uses thereof.

Modern packing house practice requires the use of curing brines containing salt, sugar, nitrate and nitrite. Freshly made salt brine, with or without added materials, is a preservative, but after it has been used for soaking or curing meat, it contains dissolved proteins, amino acids, and blood serum.

Heretofore bacteria have always been present in such brine, particularly after it has been once used for curing purposes. These bacteria undergo adaptation to growth in the presence of salt, and after the brine is withdrawn from the meat following a curing period of from one to eight weeks, they continue to propagate. If the same brine is used a second time, its inoculation by adapted bacteria has an effect the reverse of preservation. It promotes spoilage of various kinds, dependent upon the character of the bacteria.

Heretofore attempts have been made to regenerate used curing brine by heating it and keeping it for a prolonged period at or near the boiling point, or, at least at a pasteurizing temperature of 170 degrees F., followed by settling and filtering. But simple boiling as heretofore practiced produces a flocculent precipitate which is difficult and expensive to filter, and, considering the value of the brine, filtration under such circumstances has been uneconomical.

By such processes a single re-use of curing brine has been made possible, although unsatisfactory because of incomplete sterilization, because of the tendency of the coagulum to accumulate in pipes and on the walls of the containers in a manner to seriously interfere with heat transfer and require frequent scraping and cleaning of surfaces to not only avoid clogging of passages, but to maintain heating efficiency. Surface heating, by submerged steam pipes or in steam jacketed tubes, as heretofore practiced, meets with little success for the reason that the surfaces quickly become fouled with gelatinous coagulum, with progressive reduction in the rate of heat transfer.

Sterilization has been so incomplete and the accumulation of highly resistant spore forming and putrefactive bacteria so rapid that the boiling and repeated use of curing brines has been objected to by the Federal Bureau of Animal Industry, and such partial reclamation as has heretofore been obtainable has been so unsatisfactory that the use of curing brine which has thus been reclaimed more than once has been generally condemned.

I have found that the dissolved proteins in used curing brine have a peculiar characteristic as to form of coagulation in that they are subject to a critical point in temperature and agitation beyond which they coagulate in a form which facilitates separation from the liquid.

I have also found that a curing brine can be completely sterilized by means which largely avoid clogging of pipes and the coating of containers; overcome all difficulties in the matter of heat transfer; almost completely avoid inversion of the sugar content; enable the regenerating process to be carried on continuously, rapidly and economically; and by dehydration and dispersion of the coagulum, facilitate gravity separation.

Therefore I have devised an improved method of regenerating curing brine by adding to the brine a sufficient quantity of salt, sugar, nitrate, etc., to compensate for losses due to absorption in the meat during the preceding curing process. I place the brine in a closed container and apply mechanical pressure equal to that which is to be developed under the sterilizing temperature to be finally applied to the brine. Preferably, the brine is then pumped in a continuous stream and at a scouring velocity through passages having heated walls, whereby the brine may be progressively pre-warmed to or beyond the point of incipient coagulation. Before coagulation has become complete, I meter the flowing stream and subject it, uniformly as to all particles, to such a sudden and violent increase in temperature as to instantly and completely sterilize it and complete the coagulation of its protein content and drive out a portion of its water content, thereby raising the specific gravity of the coagulum materially above that of the brine. This instantaneous heating step is preferably accompanied by such a violent agitation of the brine as to disperse the coagulating material and keep it dispersed until its coagulation has been completed to a point where massing and adherence to passage or container walls will be minimized, and gravity separation and removal of the residue by filtration facilitated.

By pre-warming the brine under pressure and simultaneously advancing it at a scouring velocity, I keep the walls of the passages sufficiently free from deposits to maintain a substantially uniform rate of heat transfer. Coagulation appears to initiate in the form of microscopic albuminous clots upon which additional coagulable matter precipitates. A measurable amount of time is required to complete such precipitation, and this enables me to pre-warm the brine to at least 170° F. with little evidence of coagulation except in the final pre-warming stages, whereupon, I subject it to the dispersing effect of jets of steam delivered through the brine at high pressure and temperature and in sufficient quantity to disperse the coagulating clots and simultaneously raise the temperature within a few seconds to at least 230° F., or to a range of temperature between 230° F. and 260° F. To maintain the velocity and rate of flow, the steam should be permitted to continuously escape through a restricted vent. Under such conditions, a portion of the water content of the coagulating particles is expelled, thereby not only reducing or substantially eliminating the tendency to flocculate or to collect upon the container walls, but also creating a sufficient differential in specific gravity as between the coagulum and the brine to enable a separation of the major portion of the coagulum from the brine by gravity or centrifugal force, and the subsequent removal of the residue by filtration.

The resulting product is substantially clear and completely sterile. It retains the valuable soluble flavoring material extracted from the meat during the preceding curing process and produces a curing brine of greater value than the original because of the added amino acids and other extracts.

During the pre-warming period, heat may be transferred into the brine by any suitable means, and if the temperature is not raised to a point where coagulation is initiated, it is not material whether the brine is pre-warmed in batches or while it is being advanced in a continuously flowing stream. I prefer to put it under pressure and advance it at a scouring velocity in a continuously flowing stream in order to minimize the time and the added heat units necessary to accomplish complete sterilization without material inversion of sugar or other thermo-chemical changes. Also, by establishing the stream flow under mechanical pressure equal to that responsive to heat in the sterilizing chamber and associated passages, and by metering the brine and using a turbine or equivalent pump to drive it through the sterilizer, pulsations are avoided, such as might otherwise prevent a precisely equal treatment of all particles.

I prefer to inject steam directly into the brine as a sterilizing agent for the reason that I thereby most effectively accomplish instantaneous heating and the desired degree of agitation and resultant dispersion and dehydration of the coagulating particles.

Steam jet sterilization makes possible the substantial removal of all heat-coagulable proteins, thus preventing a cumulative increase of such protein. Simple boiling removes only a part of the coagulable proteins.

The steam jet treatment has a further effect of breaking down part of the coagulable proteins to uncoagulable amino acids, thereby increasing the component of amino acids, which determine the flavor value of the brine. Some amino acids are accumulated in a curing brine directly from the meat, and a brine which is clarified and used a second time is distinctly superior to a fresh brine in producing a fine flavor. The soluble flavor-imparting ingredients are believed to be due mostly to the low molecular weight amino acids. The sterilization treatment increases the proportion of amino acids believed to be cleavage fractions from the protein molecules, and at the same time, and as a result of such cleavage, produce a superior flavor. Such a brine is characterized not only by a distinctive flavor but by absence of protein, coagulable by further heating, and by substantial absence, beyond a trace, of invert sugars. It is also sterile to the extent of being completely free of spores.

A preferred method of using the process described is to first add to the used solution enough freshly made solution to approximately restore the substances absorbed by the meat and then re-standardize by adding dry ingredients. The solution is then processed as above described, and re-used. In this way the curing solution may be maintained uniform as to flavor quality.

A modification of the described process may be used. This consists of eliminating the surface heater and heating by direct steam only. This causes dilution of the liquid by condensed steam. To offset this dilution, the solution is first standardized with an excess of dry ingredients such that the dilution incidental to heating to the boiling point restores the desired density.

Another modification consists of discharging the liquid from the sterilizer to a vacuum receiver, thereby cooling and removing part of the condensate from direct steam heating. Centrifuging and filtration are carried out as set forth in the description of the preferred method.

Various forms of apparatus are available for carrying out my process.

In the accompanying drawings:

Figure 1 is a conventional illustration of a form of apparatus which I prefer to employ in carrying out my process continuously.

Figure 2 is a vertical sectional view of a sterilizing column forming part of said apparatus.

Figure 3 is a sectional view, drawn to line 3—3 of Figure 1.

Figure 4 is a sectional view, drawn to line 4—4 of Figure 3.

Figure 5 is a vertical, longitudinal sectional view of a heat exchanger forming part of said apparatus.

Figure 6 is a view, in vertical section, of a modified means for pre-warming and sterilizing the brine preparatory to reducing its temperature and separating the coagulum.

Figure 7 is a sectional view, drawn to line 7—7 of Figure 6.

Like parts are identified by the same reference characters throughout the several views.

A pump 10, preferably of the screw type and driven by a motor 11, is employed to draw the used brine from a suitable source of supply through a suction pipe 12 and deliver it through a pipe 13 and a flow indicator 14 into a suitable heat exchanger. To accurately regulate the pressure, some of the liquid so pumped is by-passed through the pipe 17 and pressure regulator 18 to the suction side of the pump.

The heat exchanger may be of any ordinary type capable of being taken apart and readily cleansed. A heat exchanger capable of being readily taken apart and cleansed is illustrated in Figure 5, in which sets of brine conveying pipes 22 are mounted in permanent jacket heads 23 of cylindrical jackets 24. Each of the heads has a removable cap suitably ported and channeled to direct the brine from the inlet pipe 13 serially through the pipes 22 to an outlet pipe 27. The jackets 24 are supplied with hot water or steam through an inlet pipe 28, the heating fluid being circulated or delivered through an outlet pipe 29. The brine is delivered through pipe 27 into a heater 30 of sufficient capacity to instantly bring the pressure and temperature of the brine into equilibrium, the pressure of the brine within the heat exchanger being wholly dependent upon the pump.

The heater 30 is operated by injecting steam directly into the brine from a steam pipe 31 and the brine is thereby instantly driven into a separating chamber 32 through the pipe 33, which has a non-splashing outlet 34 within the chamber 32. From the top of this chamber excess steam and dissolved air may be released through the vent pipe 35 and a valve 36 which is automatically controlled by a reversely acting diaphragm pressure regulator 37 of ordinary type, which operates to open the valve 36 whenever the pressure in chamber 32 exceeds a predetermined pressure under which the brine is to be sterilized.

Air under pressure is supplied to the upper side of the diaphragm in chamber 37 through a pipe 38, controlled by a valve at 39, which automatically opens under vapor pressure derived from chamber 32 through a pipe 40. Such pressure regulating mechanisms being in common use, further description is deemed unnecessary.

The brine is immediately withdrawn from the bottom of chamber 32 by a pump 41, preferably a turbine pump, operated at a speed in excess of the supply from chamber 32, that chamber being kept constantly empty or substantially empty. Therefore the brine entering chamber 32 is instantly driven by the pump 41 into the column sterilizer now to be described.

The material delivered by the turbine pump 41 passes through pipe 62 and its branches 63 and 64 (Figure 3), into cavities 65 and 66 (Figure 4), near the ends of the base portion 60 of the sterilizer column.

Steam from the supply pipe 31 is delivered into the cavities 65 and 66 of the base through end ports 73, distributing cavities 74, and sets of expansion nozzles 75. The nozzles 75 are each axially aligned with similarly formed outlet nozzles 76 of larger capacity in the opposite walls of these cavities 65 and 66, whereby the steam and the brine which it encounters are driven into a central cavity 67 and upwardly through an outlet 68 into a baffle column 70.

Each nozzle 75 is not only paired with a nozzle 76, but these pairs of nozzles are aligned with, and opposed to, corresponding nozzles associated with the cavity 65, whereby the streams of brine and steam will be jetted with great force against each other in the cavity 67, thus aiding in dispersion of coagulum and probably increasing the sterilizing efficiency.

The steam does not condense into the brine, since the steam and brine are in pressure and temperature equilibrium, and substantially all the energy of the adiabatically expanding steam becomes kinetic energy and is utilized to drive the brine upwardly at an extremely high speed through the baffle column 70, in which a series of perforate partitions 92 alternate with disk-shaped baffle plates 96, whereby the brine is jetted through the perforations in the partitions and deflected laterally by the intervening baffle plates 96. From the top portion of the column the steam and the brine pass through a pipe 97 into a separating chamber 98, from the top portion of which the steam is allowed to escape through a diaphragm controlled pressure regulating valve 99, which is adjusted to regulate the resistance or back pressure in the chamber 98 and the temperature of the brine in the baffle column.

In the chamber 98 the brine drops by gravity and is discharged through a valve 100 which regulates the outflow of the brine in correspondence with the metered inflow and prevents any accumulation of a large quantity of brine in the chamber 98, while also preventing the escape of steam past this valve. The brine which passes this valve 100 enters a hopper-like receiving chamber 108, from which it is withdrawn by a pump 109 through a heat exchanger 110 which may be similar in construction to the heat exchanger illustrated in Figure 5, although cold water will be delivered to the jacket cavity through the inlet pipe 28, whereby the brine may be quickly reduced to or below atmospheric temperature. From the heat exchanger it passes into a so-called basket centrifuge 111 of ordinary type, in which centrifugal force is utilized to pack the coagulum in the annular channels 112 while the brine is being delivered over the top 113 and through the outlet 114 into a mixer 115, into which filter aid material may be continuously delivered from a supply chamber 116 in a well known manner. The brine then passes through an ordinary filter press 118 for final clarification.

The time interval during which the brine is exposed to a sterilizing temperature is important. In order to obtain complete sterilization without inversion of any material proportion of the sugar content of the brine, I prefer to employ pumps which do not produce pulsations and which are capable of delivering the brine through the sterilizer 30 and its associated baffle column and pressure regulating chamber 98 to the cooling heat exchanger within a time interval not exceeding one minute in duration.

The extremely violent agitation, coupled with the high pressure under which this portion of the system operates, enables me to complete the coagulation of the protein material under conditions which densify it and thereby raise its specific gravity materially above that of the brine, while also keeping it under high velocity to avoid any rapid coating or clogging of the walls of the passages or containers. I find that large batches of used brine, or even several successive batches, may be regenerated without clogging the apparatus, and even without any material reduction in its efficiency for sterilizing the brine and maintaining a constant flow through the filter.

The brine passes through the pre-warming heat exchanger in about twenty seconds, and each particle is above the coagulation temperature only a fraction of this time. The time interval required for this colloidal reaction is greater than the time interval the liquid is in contact with the heating surfaces of the exchanger. While the coagulation step may be completed in the sterilizer, each particle of brine is in the sterilizer only a few seconds, during which it is subjected to extremely high pressure and scouring velocities—uniform as to all particles of the brine.

While the above described apparatus is not essential to the practice of my process, it is preferred for the reason that uniform results can be expected. Similar apparatus has been very successfully used for sterilizing dairy products, cream soups, and vegetable juices, to be marketed in hermetically sealed packages. It is possible to dispense with various elements of the apparatus as disclosed, particularly the heat exchangers, but they are useful in reducing the time interval during which the sugar content of the brine might otherwise become inverted, and during which the coagulum might become precipitated instead of being held in suspension pending its delivery to the centrifuge.

However, in Figures 6 and 7, I have illustrated less expensive apparatus which may be used to regenerate brine sufficiently for practical purposes where exact uniformity of result is not deemed necessary. In this modified apparatus the brine is delivered through a pipe 125 into a horizontally disposed cylinder 126 which contains a scouring screw conveyor which has its helical flight 127 mounted on a hollow drum 128, containing steam supply passages 129 provided with nozzles 130. At one end of the passages 129 there is a stationary steam chest 131, having a port 132 in its bottom portion through which steam may be delivered into the lower passage 129 from which the nozzles 130 extend downwardly and are adapted to deliver steam into the brine in the bottom portion of the cylinder 126.

In the practice of my process the brine is fed into the cylinder 126 at a sufficient rate to maintain a constant level at a horizontal plane intersecting the drum and sealing the spaces between the several turns of the conveyor flight. Above the drum these spaces are vented through the tubes 135 into a steam chamber 136, which is preferably cylindrical in form and provided with baffle disks 137 having their upper margins provided with notches 138 through which the steam may flow to a suitable exhaust pipe 139.

If desired, the exhaust pipe 139 may be connected with a heat exchanger 140, whereby the steam may be utilized to pre-warm the brine preparatory to its entry into the sterilizing cylinder 126. The pre-warming chamber is not essential, but serves as a convenient means for conserving the heat of the steam. The pressure in the cylinder 126 may be regulated by a valve 142 in the exhaust pipe 139. The heat in the sterilizing cylinder may be controlled automatically by a heat regulating or pressure bulb 145 in the vent chamber 136, this bulb being connected by a pipe 146 with a diaphragm chamber 147 which controls the inlet valve 148 in accordance with common practice, where steam delivery is to be controlled with reference to a desired temperature in a heating system.

The conveyor may be driven from any suitable source of power by means of a pulley 150, and by means of an outlet pipe 151, the sterilized brine may be conveyed through an expansion chamber, centrifuge and filter in a manner similar to that above described with reference to the apparatus shown in Figure 1.

It will be noted that in the apparatus shown in Figures 6 and 7, scouring is primarily accomplished by means of the screw conveyor until after sterilization is completed and the coagulum dispersed and the particles densified, whereupon they are driven through the pipe 151 at a scouring velocity. Due to the fact that the apparatus illustrated in Figures 6 and 7 is operated with the cylinder 126 only about half full of brine, there will be little tendency for particles of coagulum to be driven upwardly through the pipes 135 into the vent chamber 136.

However, should the vent chamber tend to become clogged after prolonged use, one of its heads may be removed and the baffle plates 137 withdrawn by means of their connecting rod 155, thereby clearing all of the pockets in the vent chamber 136 in one operation.

It will be apparent to those skilled in the art that various other forms of apparatus may be employed in the practice of my improved process. It will also be apparent that, if desired, gravity separation of the densified coagulum may be substituted for either the centrifuge or the filter, or for both, although centrifuging and filtering are preferred for the reason that the regeneration of the brine may be thereby continuously carried on and more speedily completed, with less precipitation on the walls of pipes and containers than by batch sterilization and gravity separation.

The chemical composition and results from use of a brine made as above described, differ markedly from the characteristics of brines heretofore known and used.

Simple heating or boiling and filtration removes some coagulum from a used curing brine, but removes only about one-third of the coagulable proteins. Regenerated brine made by the processes heretofore known contains large quantities of protein which will coagulate at 260° F., and deposits a heavy precipitate of albuminous material, whereas the brine prepared in accordance with the process herein described will show no such precipitation and will remain clear throughout such a test.

The sterilization process herein disclosed coagulates and removes as a heavy precipitate a quantity of coagulable protein at least double that removable by simple heating. It further, and as a more important effect, accomplishes a break down of the remaining protein to smaller molecular size and allows such protein to remain in solution. The amino acid content available as flavoring material is thus increased. Such soluble and uncoagulable protein of small molecular weight permeates hams and other meats and has the effect of generating curing flavor more rapidly and to a greater extent than possible if fresh curing brine is used. Thus the result is a better or more distinctly flavored meat, with a shorter curing time. Using the processed curing brine herein described, the flavor heretofore producible only by curing for 60 days is found to be produced in about 6 days.

This accelerated curing or development of flavor, is assumed to be the result of increased amino acid content of the brine. But it is probable that many other flavorous compounds may be involved in the curing reactions.

I claim:

1. The process of regenerating meat curing brine, containing bacteria and meat proteins consisting in restoring to the brine substantially a like quantity of the constituents absorbed by the meat during a previous curing operation, momentarily subjecting each particle of the brine to steam at a high temperature for a brief period of a few seconds to completely sterilize it and convert at least a portion of its protein content into a coagulum of higher specific gravity than that of the brine, and then centrifuging the brine to separate the coagulum.

2. The process of regenerating meat curing brine containing bacteria and meat proteins which consists in advancing the brine through a heat exchanger at a scouring velocity, pre-warming the advancing stream of brine and continuously subjecting its more advanced portions momentarily to a degree of temperature and agitation with steam sufficient to bring about complete sterilization and partial dehydration and dispersion of at least a portion of the proteins undergoing coagulation, then reducing the temperature prior to material inversion of the sugar content, centrifuging the brine to remove massed coagulum, and then filtering the brine to eliminate cloudiness due to the presence of fine particles in suspension.

3. The process of regenerating used meat curing brine containing bacteria, sugar and meat proteins, consisting in momentarily raising its temperature from a substantially normal room temperature to a temperature in excess of 230° F. and maintaining such temperature for a few seconds while delivering steam through the brine at a high velocity in substantial temperature and pressure equilibrium with the brine to sterilize the brine, disperse coagulating proteins in part and concentrate the remainder to a specific gravity in excess of that of the untreated used brine, then immediately reducing the temperature of the brine substantially to normal and subsequently separating therefrom the coagulum of higher specific gravity than that of the brine.

GEORGE GRINDROD.